(12) United States Patent
Rekhels

(10) Patent No.: US 7,661,346 B1
(45) Date of Patent: Feb. 16, 2010

(54) GUIDE ASSEMBLY FOR POWER TOOLS AND ASSOCIATED METHOD

(76) Inventor: Alexander Rekhels, 545 Neptune Ave., #22C, Brooklyn, NY (US) 11224

( * ) Notice: Subject to any disclaimer, the term of this patent is extended or adjusted under 35 U.S.C. 154(b) by 312 days.

(21) Appl. No.: 11/893,946

(22) Filed: Aug. 17, 2007

Related U.S. Application Data

(60) Provisional application No. 60/822,654, filed on Aug. 17, 2006.

(51) Int. Cl.
*B26D 1/04* (2006.01)
(52) U.S. Cl. .......................................... 83/574; 83/614
(58) Field of Classification Search ................... 83/574, 83/750, 455, 614; 409/182
See application file for complete search history.

(56) References Cited

U.S. PATENT DOCUMENTS

| | | | | |
|---|---|---|---|---|
| 2,746,493 A | * | 5/1956 | Babcock ....................... 30/394 |
| 3,866,496 A | * | 2/1975 | Payne et al. ................. 83/471.3 |
| 4,281,694 A | * | 8/1981 | Gorman .................... 144/154.5 |
| 4,727,941 A | * | 3/1988 | Fulton .......................... 173/29 |
| 4,802,399 A | * | 2/1989 | Olson ........................... 83/425 |
| 5,044,075 A | * | 9/1991 | Brennan et al. ......... 29/890.031 |
| 5,107,736 A | * | 4/1992 | Albrecht ..................... 83/471.3 |

* cited by examiner

*Primary Examiner*—Kenneth E. Peterson

(57) ABSTRACT

A guide assembly for power tools includes a rectilinear guide and a rotary guide slidably attached to the rectilinear guide with a post with axially opposed top and bottom ends respectively. The rotary guide further includes a knob provided with a rod with a first end directly attached to a bottom surface of the knob. The assembly further includes a mechanism for slidably attaching the rotary guide to the rectilinear guide and a mechanism for removably securing the rectilinear guide to a support surface. The removable securing mechanism further includes an opening formed in each of the end caps and located in a central region thereof.

4 Claims, 4 Drawing Sheets

GUIDE ASSEMBLY FOR POWER TOOLS AND ASSOCIATED METHOD

CROSS REFERENCE TO RELATED APPLICATIONS

This application claims the benefit of U.S. Provisional Application No. 60/822,654, filed Aug. 17, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to tool guides and, more particularly, to a guide assembly for power tools for assisting a user to make accurate cuts easily and quickly when employing power saws and like power tools.

2. Prior Art

Archeological evidence proves that man was using tools at least four million years ago. For thousands of years, their development continued at a steady pace, as better materials and innovations slowly transformed the devices we use to shape the world. After World War II, a new tool market sprang up in the form of homeowners and do-it-yourselfers who wanted to save money by tackling repairs and building projects themselves. This meant creating portable power tools and scaled-down machines that were lighter, easier to use, and more affordable than their industrial-strength predecessors.

Power tools from the 1940s and '50s are some of the most exciting ever created. Especially pleasing to the eye, most were constructed with aluminum bodies, which reflected the styling of the day. Jigsaws and drills often had streamlined, bullet-shaped bodies, which looked like they were developed in a wind tunnel. But, by far, the greatest improvements to power tools were made in comparatively recent power tools.

The best power tools are precision-engineered devices capable of performing their cutting, boring, drilling, sanding, sawing and planking tasks remarkably well. But power tools and the accessories, jigs, and gizmos that go with them are noteworthy objects in and of themselves, symbols of sophisticated building technology and practice. Obviously, it would be advantageous to provide a means for assisting in the precision use of circular saws, jig saws, rotary tools and the like.

U.S. Pat. No. 6,116,304 to Wilson discloses a power tool guide system that includes a base plate and at least one stanchion assembly mounted on the base plate. The system also includes a guide assembly mounted on the stanchion assembly for slidably receiving a power tool thereon above base plate. Unfortunately, this prior art example does not provide a means for attaching the system to a preexisting workbench.

U.S. Pat. No. 6,725,558 to Gommper discloses an adjustable portable power tool guide having a base plate, a base plate cutting edge to define a cut line, an adjustable tool guide rail for guiding a portable power tool cutter adjacent to the cutting edge, and an adjustable control bar that defines a reliable and predetermined angle between the cutting edge and the control bar. Unfortunately, this prior art example does not provide a means for attaching the system to a preexisting workbench.

U.S. Pat. No. 4,489,634 to Volk discloses a table for supporting and guiding diverse portable power tools with precision and safety. In one mode of use with a sabre saw, adjustable guide rails for the saw have free-floating engagement with locator posts on the table and rest directly on the workpiece which is being cut. The guide rails at one end can be raised or lowered for precise leveling and locked in the chosen position. Very smooth cutting by the sabre saw is enabled without chattering of the work piece. In another form of the table there is a second mode of use with a circular saw or router, and the guide rails are supported at a fixed height atop the locator posts and above the top surface of the work piece resting on the table. A work piece protractor guide on the table enables various cutting angles. Precision cutting of cove molding by a sabre or circular saw is possible by proper angular adjustment of the protractor guide and saw blade. The sabre saw can also be used in a ripping mode across the guide rails when the latter are supported at a fixed height atop the locator posts. Unfortunately, this prior art example does not provide a means for attaching the system to a preexisting workbench.

Accordingly, the present invention is disclosed in order to overcome the above noted shortcomings. The present invention satisfies such a need by providing an apparatus that is simple and easy to use, lightweight yet durable in design, and designed for assisting a user to make accurate cuts easily and quickly when employing power saws and like power tools. The guide assembly for power tools provides a user a simple means for ensuring precise operation of various types of power tools. The present invention is simple to use, inexpensive, and designed for many years of repeated use.

BRIEF SUMMARY OF THE INVENTION

In view of the foregoing background, it is therefore an object of the present invention to provide a means for assisting a user to make accurate cuts easily and quickly when employing power saws and like power tools. These and other objects, features, and advantages of the invention are provided by a guide assembly for power tools.

A guide assembly for power tools includes a rectilinear guide. Such a rectilinear guide effectively has a slot formed therein, and such a slot has a longitudinal length oriented parallel to opposed lateral edges of the rectilinear guide and further is equidistantly spaced from the respective lateral edges. The slot has longitudinally opposed ends terminating proximal of associated ones of longitudinally opposed ends of the rectilinear guide.

The assembly further includes a rotary guide slidably attached to the rectilinear guide and extending upwardly and away therefrom. Such a rotary guide includes a plurality of cylindrical clamps. Each of such clamps conveniently has manually adjusted inner diameters. The rotary guide further includes a sleeve monolithically formed with an outer surface of the clamp. Such a sleeve has a centrally registered axis oriented parallel with a centrally registered axis of the clamp. The sleeve also has an aperture formed in a medial portion of an outer surface thereof and located diametrically opposite of the clamp. Such an aperture has a centrally registered axis oriented perpendicular to the centrally registered axis of the sleeve.

The rotary guide further includes a post with axially opposed top and bottom ends respectively. Such a post advantageously has a diameter that is less than a diameter of the sleeve such that the post is interfitted within the sleeve, and the sleeve is telescopically adjusted along an entire longitudinal length of the post. The rotary guide further includes a knob provided with a rod with a first end directly attached to a bottom surface of the knob. Such a rod has a second end extending outwardly and away from the first end of the rod, and the rod has a longitudinal length registered at a right angle to the bottom surface of the knob. The rod further effectively rotates in sync with the knob. The second end of the rod is interfitted within the aperture of the sleeve such that the second end of the rod is abutted directly against an outer surface of the post thereby prohibiting the sleeve from prematurely and undesirably shifting along the longitudinal length of the post during operating conditions.

The assembly further includes a mechanism for slidably attaching the rotary guide to the rectilinear guide. Such a slidably attaching mechanism includes a substantially U-shaped base plate with a closed end integrally attached to the bottom end of the post. The post is conveniently located in a center region of the top end of such a base plate, and the closed end of the base plate has an upper surface registered perpendicular to the longitudinal length of the post. The base plate has a lateral width that is greater than a lateral width of the rectilinear rail such that the rectilinear rail is slidably interfitted within an open end of the base plate. The base plate is further adjusted along an entire longitudinal length of the rectilinear rail. An upper surface of the rectilinear rail is advantageously abutted directly against a lower surface of the base plate when the rectilinear rail is slidably interfitted within the open end of the base plate.

The slidably attaching mechanism further includes a plurality of holes formed in longitudinally opposed ends of the base plate. Such holes are equidistantly spaced from each other and the opposed ends respectively, and further are equidistantly spaced from opposed lateral edges respectively of the base plate. The holes effectively have a centrally registered axis oriented perpendicular to the upper surface of the base plate. The mechanism further includes a bolt with axially opposed top and bottom ends respectively. Such a bolt has a diameter that is less than a lateral width of the slot such that the bolt is penetrated therethrough during operating conditions. The bottom end of the bolt has a stop member monolithically formed therewith and contacting a lower surface of the rectilinear rail. The top end of the bolt conveniently penetrates through the slot and an associated one of the holes of the base plate respectively such that the top end of the bolt is disposed above the closed end of the base plate. The bolt has a longitudinal length registered perpendicular to the longitudinal length of the rectilinear rail when the bolt is penetrated through the slot.

The slidably attaching mechanism further includes a wing-nut attached to the top end of the bolt and adjusted along the longitudinal length thereof. Such a wing-nut contacts the upper surface of the base plate during operating conditions. The stop member and the bolt and the base plate and the wing-nut respectively cooperate to prohibit the base plate from prematurely and undesirably shifting along the longitudinal length of the rectilinear rail during operating conditions.

The assembly further includes a mechanism for removably securing the rectilinear guide to a support surface. Such a removable securing mechanism includes a pair of substantially U-shaped end caps slidably interfitted over the rectilinear rail. Each of such end caps are simultaneously and independently adjusted along the longitudinal length of the rectilinear rail, and each further has an open end provided with a lower surface abutted directly against the upper surface of the rectilinear rail when the end caps are slidably interfitted thereon. The end caps advantageously have a lateral width that is greater than the lateral width of the rectilinear rail.

The removable securing mechanism further includes an opening formed in each of the end caps and located in a central region thereof. Such an opening effectively has a centrally registered axis oriented perpendicular to an upper surface thereof, and a pair of spindles has axially opposed top and bottom ends respectively. Each of such spindles has a diameter that is less than the lateral width of the slot such that that the spindle is penetrated therethrough during operating conditions. The bottom end of the spindle has a disc monolithically formed therewith, and such a disc has a top surface oriented perpendicular to a longitudinal length of the spindle. The top end of the spindle conveniently penetrates through the slot and the opening of the end cap such that the top end of the spindle is disposed above the closed end of the end cap. The longitudinal length of the spindle is registered perpendicular to the longitudinal length of the rectilinear rail when the spindle is penetrated through the slot.

The removable securing mechanism further includes a wing-nut attached to the top end of the spindle and adjusted along the longitudinal length thereof. Such a wing-nut contacts the upper surface of the end cap during operating conditions. The disc and the spindle and the end cap and the wing-nut respectively cooperate to advantageously prohibit the end cap from prematurely and undesirably shifting along the longitudinal length of the rectilinear rail during operating conditions.

The removable securing mechanism further includes a first arm provided with top and bottom surfaces and opposed right and left ends respectively. Such a top surface and right end respectively of the first arm is statically connected directly to a bottom surface of the disc, and the left end of the first arm extends outwardly and away from the right end of the first arm. The first arm has a longitudinal length that is greater than a diameter of the disc, and the longitudinal length of the first arm is oriented at a right angle to the bottom surface of the disc. The bottom surface of the right end of the first arm effectively has a cavity monolithically formed therein.

The removable securing mechanism further includes a rectilinear beam with axially opposed top and bottom ends respectively. The top end of such a beam is statically interfitted within the cavity of the right end of the first arm, and the bottom end of the beam extends downwardly from the top end of the beam. The mechanism further includes a second arm with opposed right and left ends respectively. The right end of such a second arm conveniently has a passageway formed therein such that the bottom end of the beam is telescopically interfitted within the passageway of the right end of the second arm, and the second arm is telescopically adjusted along an entire longitudinal length of the beam. The second arm further has a longitudinal length that is equal to the longitudinal length of the first arm and further is registered in parallel with the longitudinal length of the first arm when the beam is interfitted within the passageway of the right end of the second arm. The left end of the second arm has a bore formed therein. Such a bore has a centrally registered axis oriented at a right angle to the longitudinal length of the second arm.

The removable securing mechanism further includes a shaft with axially opposed top and bottom ends respectively. The top end of such a shaft advantageously has a stop block monolithically formed therewith. Such a stop block has a diameter that is greater than a diameter of the shaft and the bore respectively. The shaft is effectively interfitted within the bore and adjusted along an entire longitudinal length thereof. The mechanism further includes a linear handle integrally attached to the shaft and spaced from the bottom end thereof, the handle extending beyond diametrically opposed outer surfaces of the shaft. Such a handle has a longitudinal length oriented perpendicular to the longitudinal length of the shaft, and the shaft rotates in sync with the handle. The first arm and the beam and the second arm and the shaft and the stop block respectively conveniently cooperate to maintain the rectilinear guide and the rotary guide respectively in a fixed position when the guide system is attached to a support surface.

A method for assisting a user to make accurate cuts easily and quickly when employing power saws and like power tools via use of a guide assembly includes the steps of: providing a rectilinear guide and attaching the rotary guide to the rectilinear guide. Such a rotary guide extends upwardly and away from the rectilinear guide. The steps further include securing the rectilinear guide to a support surface.

The method further includes the step of providing a plurality of cylindrical clamps. Each of such clamps has manually adjusted inner diameters. The steps further include providing a sleeve monolithically formed with an outer surface of the clamp. Such a sleeve has a centrally registered axis oriented parallel with a centrally registered axis of the clamp, and further has an aperture formed in a medial portion of an outer surface thereof and located diametrically opposite of the clamp. Such an aperture has a centrally registered axis oriented perpendicular to the centrally registered axis of the sleeve.

The steps further include interfitting a post with axially opposed top and bottom ends respectively within the sleeve. Such a post has a diameter that is less than a diameter of the sleeve. The steps further include: adjusting the sleeve telescopically along an entire longitudinal length of the post and providing a knob with a rod with a first end directly attached to a bottom surface of the knob. Such a rod has a second end extending outwardly and away from the first end of the rod, and the rod has a longitudinal length registered at a right angle to the bottom surface of the knob. The steps further include rotating the rod in sync with the knob and interfitting the second end of the rod within the aperture of the sleeve such that the second end of the rod is abutted directly against an outer surface of the post thereby prohibiting the sleeve from prematurely and undesirably shifting along the longitudinal length of the post during operating conditions.

The method further includes the step of providing a substantially U-shaped base plate with a closed end integrally attached to the bottom end of the post. The post is located in a center region of the top end of such a base plate, and the closed end of the base plate has an upper surface registered perpendicular to the longitudinal length of the post. The base plate has a lateral width that is greater than a lateral width of the rectilinear rail. The steps further include: interfitting the rectilinear rail within an open end of the base plate; adjusting the base plate along an entire longitudinal length of the rectilinear rail; abutting an upper surface of the rectilinear rail directly against a lower surface of the base plate when the rectilinear rail is slidably interfitted within the open end of the base plate; and providing a plurality of holes formed in longitudinally opposed ends of the base plate. Such holes are equidistantly spaced from each other and the opposed ends respectively, and further are equidistantly spaced from opposed lateral edges respectively of the base plate. The holes have a centrally registered axis oriented perpendicular to the upper surface of the base plate.

The steps further include penetrating a bolt with axially opposed top and bottom ends respectively through the slot during operating conditions. The bottom end of such a bolt has a stop member monolithically formed therewith and contacting a lower surface of the rectilinear rail, and the top end of the bolt penetrates through the slot and an associated one of the holes of the base plate respectively such that the top end of the bolt is disposed above the closed end of the base plate. The bolt has a longitudinal length registered perpendicular to the longitudinal length of the rectilinear rail when the bolt is penetrated through the slot.

The steps further include attaching a wing-nut to the top end of the bolt and adjusting the wing-nut along the longitudinal length of the bolt. Such a wing-nut contacts the upper surface of the base plate during operating conditions. The stop member and the bolt and the base plate and the wing-nut respectively cooperate to prohibit the base plate from prematurely and undesirably shifting along the longitudinal length of the rectilinear rail during operating conditions.

The method of further includes the steps of: interfitting a pair of substantially U-shaped end caps over the rectilinear rail; adjusting each of the end caps simultaneously and independently along the longitudinal length of the rectilinear rail; and abutting a lower surface of an open end of each of the end caps directly against the upper surface of the rectilinear rail when the end caps are slidably interfitted thereon. Such end caps have a lateral width that is greater than the lateral width of the rectilinear rail. The steps further include providing an opening formed in each of the end caps and located in a central region thereof. Such an opening has a centrally registered axis oriented perpendicular to an upper surface thereof.

The steps further include penetrating a pair of spindles with axially opposed top and bottom ends respectively through the slot during operating conditions. The bottom end of such a spindle has a disc monolithically formed therewith, and the disc has a top surface oriented perpendicular to a longitudinal length of the spindle. The steps further include penetrating the top end of the spindle through the slot and the opening of the end cap such that the top end of the spindle is disposed above the closed end of the end cap. The longitudinal length of the spindle is registered perpendicular to the longitudinal length of the rectilinear rail when the spindle is penetrated through the slot.

The steps further include attaching a wing-nut to the top end of the spindle and adjusting the wing-nut along the longitudinal length of the spindle. Such a wing-nut contacts the upper surface of the end cap during operating conditions. The disc and the spindle and the end cap and the wing-nut respectively cooperate to prohibit the end cap from prematurely and undesirably shifting along the longitudinal length of the rectilinear rail during operating conditions.

The method further includes the steps of providing a first arm with top and bottom surfaces and opposed right and left ends respectively. Such a top surface and the right end respectively of the first arm are statically connected directly to a bottom surface of the disc. The left end of the first arm extends outwardly and away from the right end of the first arm, and the first arm has a longitudinal length that is greater than a diameter of the disc. The longitudinal length of the first arm is oriented at a right angle to the bottom surface of the disc, and the bottom surface of the right end of the first arm has a cavity monolithically formed therein.

The steps further include interfitting a top end of a rectilinear beam within the cavity of the right end of the first arm. Such a beam has a bottom end extending downwardly and away from the top end of the beam. The steps further include providing a second arm with opposed right and left ends respectively. Such a right end of the second arm has a passageway formed therein. The steps further include interfitting the bottom end of the beam within the passageway of the right end of the second arm and adjusting the second arm telescopically along an entire longitudinal length of the beam. The second arm has a longitudinal length that is equal to the longitudinal length of the first arm and further is registered in parallel with the longitudinal length of the first arm when the beam is interfitted within the passageway of the right end of the second arm. The left end of the second arm has a bore formed therein, and the bore has a centrally registered axis oriented at a right angle to the longitudinal length of the second arm.

The steps further include providing a shaft with axially opposed top and bottom ends respectively. Such a top end of the shaft has a stop block monolithically formed therewith. Such a stop block has a diameter that is greater than a diameter of the shaft and the bore respectively. The steps further include interfitting the shaft within the bore of the left end of the second arm. The steps further include adjusting the shaft within the bore along an entire longitudinal length of the shaft.

The steps further include providing a linear handle integrally attached to the shaft and spaced from the bottom end thereof. Such a handle extends beyond diametrically opposed outer surfaces of the shaft and has a longitudinal length oriented perpendicular to the longitudinal length of the shaft. The steps further include rotating the shaft in sync with the handle. The first arm and the beam and the second arm and the shaft and the stop block respectively cooperate to maintain the rectilinear guide and the rotary guide respectively in a fixed position when the guide system is attached to a support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged perspective view of the rotary guide as shown in

FIG. 1;

DETAILED DESCRIPTION OF THE INVENTION

Figure 1:
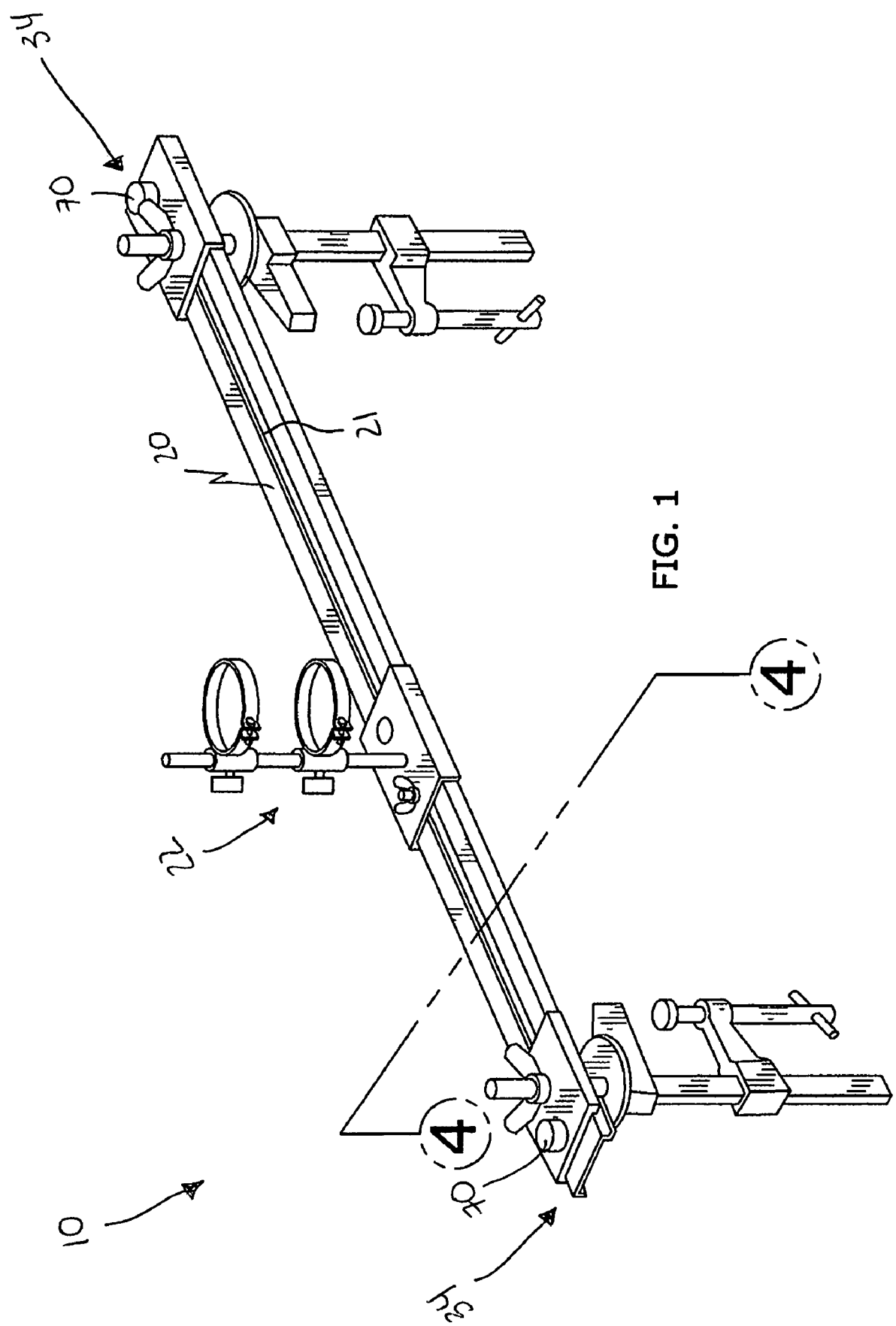
FIG. 1 is a perspective view showing a guide assembly for power tools, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide a means for assisting a user to make accurate cuts easily and quickly when employing power saws and like power tools. It should be understood that the apparatus 10 may be used to guide many different types of tools and should not be limited in guiding only those types of tools mentioned herein.

Referring to FIG. 1, a guide assembly for power tools includes a rectilinear guide 20. Such a rectilinear guide 20 has a slot 21 formed therein, and such a slot 21 has a longitudinal length oriented parallel to opposed lateral edges of the rectilinear guide 20 and further is equidistantly spaced from the respective lateral edges. The slot 21 has longitudinally opposed ends terminating proximal of associated ones of longitudinally opposed ends of the rectilinear guide 20. The rectilinear guide provides a mechanism for extending and supporting a power tool over a work bench.

Figure 2:
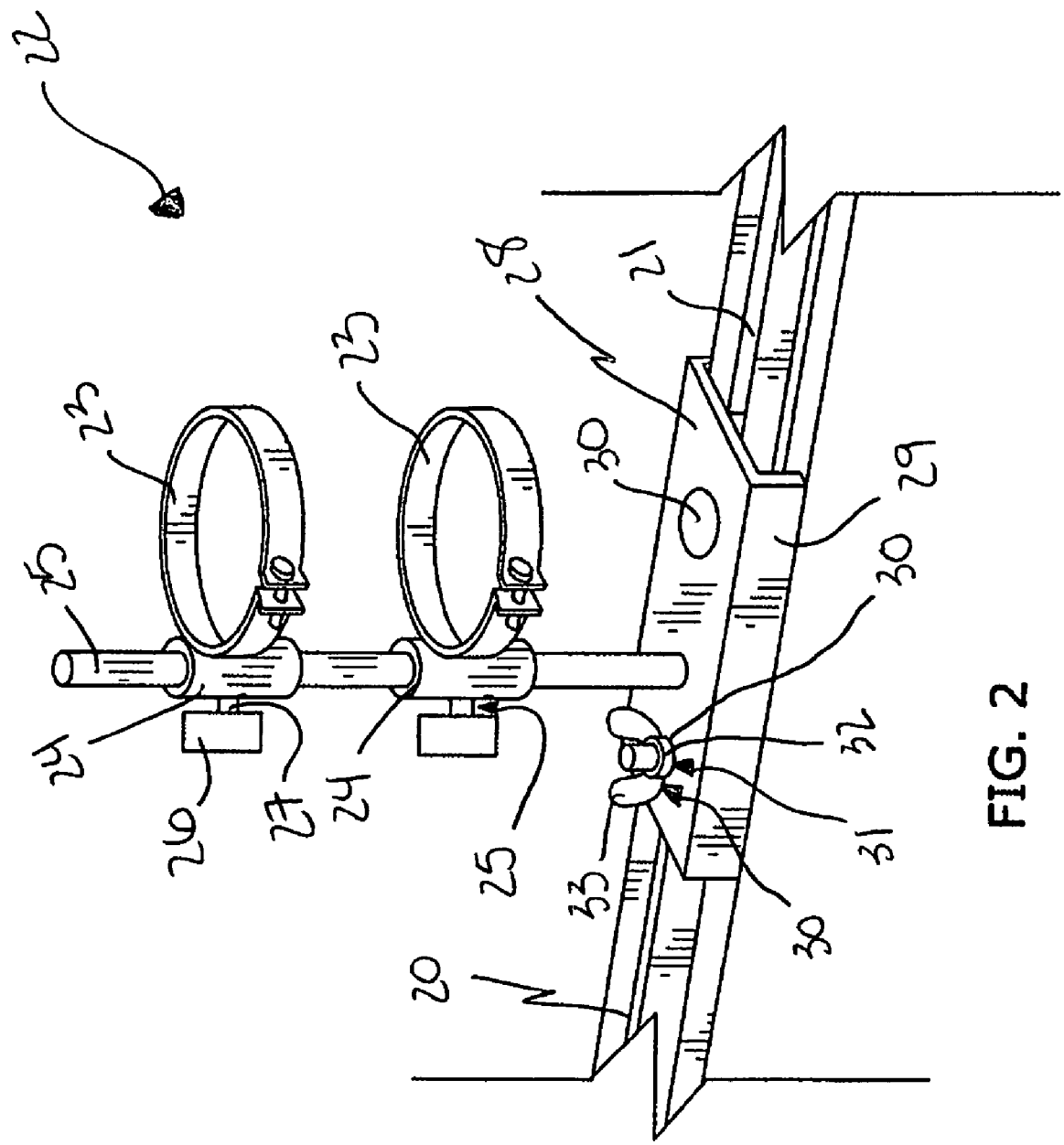

Referring to FIGS. 1 and 2, the assembly further includes a rotary guide 22 slidably attached to the rectilinear guide 20 and extending upwardly and away therefrom. Such a rotary guide 22 includes a plurality of cylindrical clamps 23. Each of such clamps 23 has manually adjusted inner diameters. The rotary guide 22 further includes a sleeve 24 monolithically formed with an outer surface of the clamp 23. Such a sleeve 24 has a centrally registered axis oriented parallel with a centrally registered axis of the clamp 23. The sleeve 24 also has an aperture 25 formed in a medial portion of an outer surface thereof and located diametrically opposite of the clamp 23. Such an aperture 25 has a centrally registered axis oriented perpendicular to the centrally registered axis of the sleeve 24. The clamps provide a means for supporting a power tool, such as a drill, above a given work space.

The rotary guide further includes a post 25 with axially opposed top and bottom ends respectively. Such a post 25 has a diameter that is less than a diameter of the sleeve 24 which is essential such that the post 25 is interfitted within the sleeve 24 and the sleeve 24 is telescopically adjusted along an entire longitudinal length of the post 25. The rotary guide 22 further includes a knob 26 provided with a rod 27 with a first end directly attached, without the use of intervening characters, to a bottom surface of the knob 26. Such a rod 27 has a second end extending outwardly and away from the first end of the rod 27, and the rod has a longitudinal length registered at a right angle to the bottom surface of the knob 26. The rod 27 further rotates in sync with the knob 26. The second end of the rod 27 is interfitted within the aperture 25 of the sleeve 24 which is critical such that the second end of the rod 27 is abutted directly against, without the use of intervening characters, an outer surface of the post 25 thereby prohibiting the sleeve 24 from prematurely and undesirably shifting along the longitudinal length of the post 25 during operating conditions. The knob provides a means for ensuring that the clamps, and any tool supported by the clamps, remains in a secured position above work space.

Referring again to FIGS. 1 and 2, the assembly further includes a mechanism for slidably attaching the rotary guide 22 to the rectilinear guide 20. Such a slidably attaching mechanism 28 includes a substantially U-shaped base plate 29 with a closed end integrally attached to the bottom end of the post 25. The post 25 is located in a center region of the top end of such a base plate 29, and the closed end of the base plate 29 has an upper surface registered perpendicular to the longitudinal length of the post 25. The base plate 29 has a lateral width that is greater than a lateral width of the rectilinear rail 20 which is crucial such that the rectilinear rail is slidably interfitted within an open end of the base plate 29. The base plate 29 is further adjusted along an entire longitudinal length of the rectilinear rail 20. An upper surface of the rectilinear rail 20 is abutted directly against, without the use of intervening characters, a lower surface of the base plate 29 when the rectilinear rail is slidably interfitted within the open end of the base plate 29. The base plate provides a mechanism for the rotary guide to be moved freely along the rectilinear rail.

The slidably attaching mechanism further includes a plurality of holes 30 formed in longitudinally opposed ends of the base plate 29. Such holes 30 are equidistantly spaced from each other and the opposed ends respectively, and further are equidistantly spaced from opposed lateral edges respectively of the base plate 29. The holes 30 have a centrally registered axis oriented perpendicular to the upper surface of the base plate 29.

The mechanism further includes a bolt 31 positioned in one of the holes 30. The bolt 31 is provided with axially opposed top and bottom ends respectively. Such a bolt 31 has a diameter that is less than a lateral width of the slot 21 which is vital such that that the bolt 31 is penetrated therethrough during operating conditions. The bottom end of the bolt 31 has a stop member 33 monolithically formed therewith and contacting a lower surface of the rectilinear rail. The top end of the bolt 31 penetrates through the slot 21 and an associated one of the holes 30 of the base plate 29 respectively such that the top end of the bolt 31 is disposed above the closed end of the base plate 29. The bolt 31 has a longitudinal length registered perpendicular to the longitudinal length of the rectilinear rail when the bolt 31 is penetrated through the slot 21. The bolt allows the base plate to be secured in a specific spot on the rectilinear beam, if desired.

The holes, respectively, house a bolt in order to secure the base plate to the guide. Alternatively, another one of the holes allows a drilling or cutting end of a power to tool to pass through the base plate and guide in order to reach the surface of the working material. The center of the single hole 30 is aligned with the center of the slot 21. The diameter of the hole 20 is the same as the width of the slot 21. The purpose of such a configuration is to allow a drilling or cutting end of power tools to path through the base plate 29 and guide 20 in order to reach the surface of the material being cut. The hole on base plate 29, located on the opposite end from hole 30 is a member of mechanism (31, 32, 33) that allows securement of a position of the base plate 29 on guide 20.

The slidably attaching mechanism further includes a wing-nut 32 attached to the top end of the bolt 31 and adjusted along the longitudinal length thereof. Such a wing-nut 32 contacts the upper surface of the base plate 29 during operating conditions. The stop member 33 and the bolt 31 and the base plate 29 and the wing-nut 32 respectively cooperate to prohibit the base plate 29 from prematurely and undesirably shifting along the longitudinal length of the rectilinear rail during operating conditions. The wing-nut provides a mechanism for easily loosening and tightening the given bolt, as need for movement of the base plate.

Figure 3:
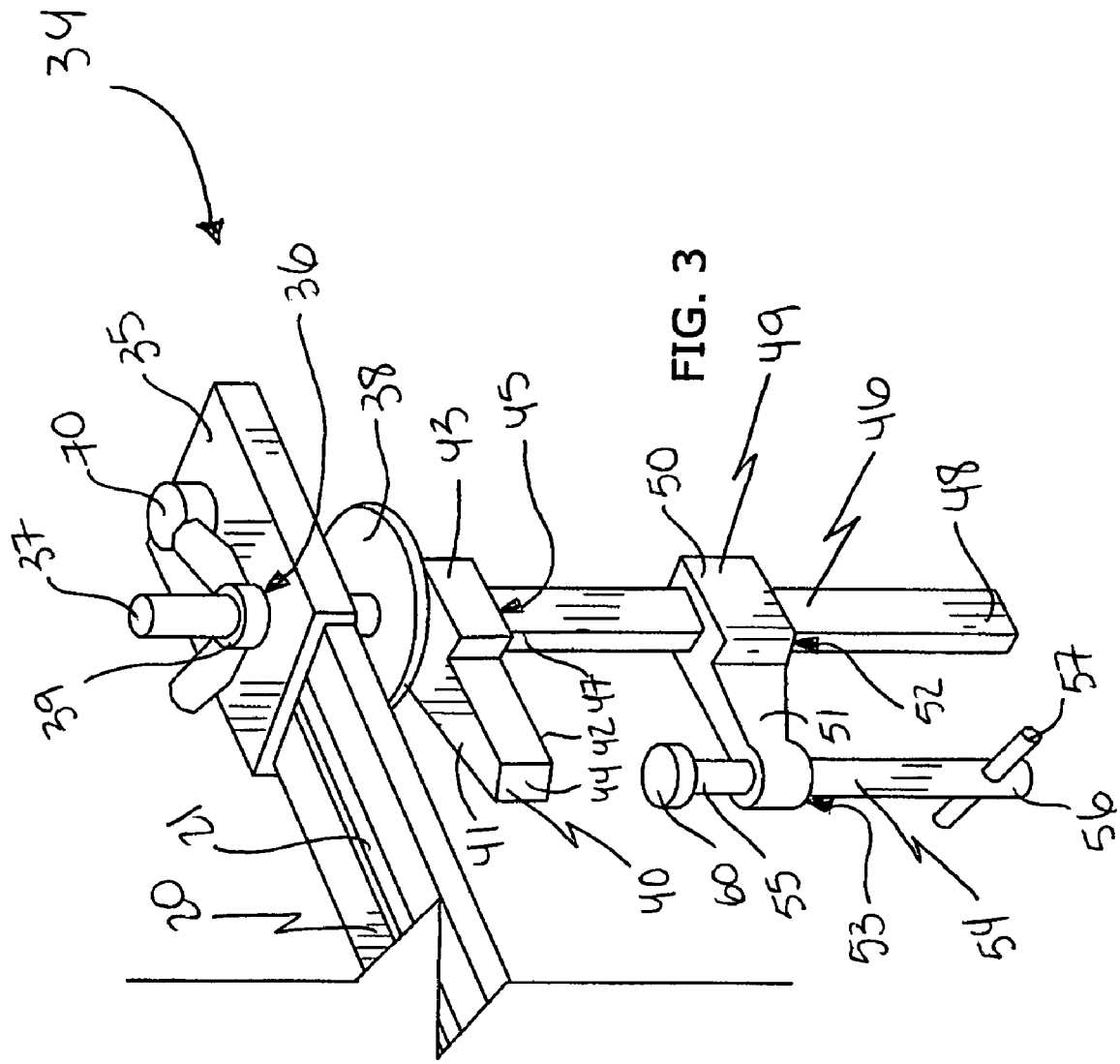
FIG. 3 is an enlarged perspective view of the removable securing mechanism as shown in FIG. 1.
Figure 4:
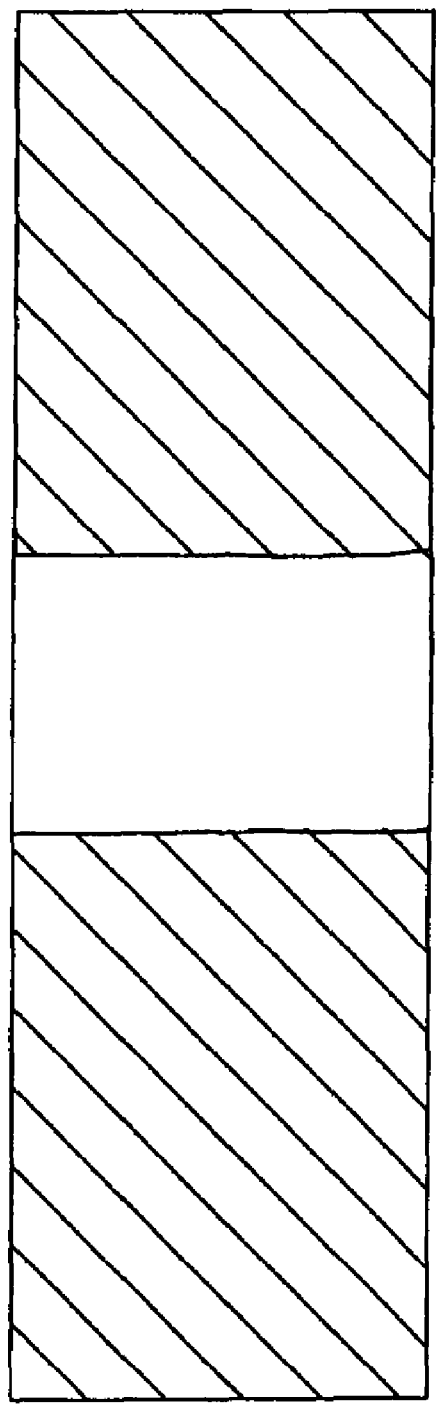
FIG. 4 is a cross sectional view of the rectilinear guide, taken along line 44, as shown in FIG. 1.

Referring to FIGS. 1 and 3, the assembly further includes a mechanism for removably securing the rectilinear guide to a support surface. Such a removable securing mechanism 34 includes a pair of substantially U-shaped end caps 35 slidably interfitted over the rectilinear rail 20. Each of such end caps 35 are simultaneously and independently adjusted along the longitudinal length of the rectilinear rail 20, and each further has an open end provided with a lower surface abutted directly against, without the use of intervening characters, the upper surface of the rectilinear rail when the end caps 35 are slidably interfitted thereon. The end caps 35 have a lateral width that is greater than the lateral width of the rectilinear rail 20. The removably securing mechanism provides a means for suspending the present invention over a given work space.

The removable securing mechanism further includes an opening formed in each of the end caps and located in a central region thereof. Such an opening 36 has a centrally registered axis oriented perpendicular to an upper surface thereof, and a pair of spindles 37 has axially opposed top and bottom ends respectively. Each of such spindles 37 has a diameter that is less than the lateral width of the slot 21 which is necessary such that that the spindle 37 is penetrated therethrough during operating conditions. The bottom end of the spindle 37 has a disc 38 monolithically formed therewith, and such a disc 38 has a top surface oriented perpendicular to a longitudinal length of the spindle and provides a mechanism for advantageously making rotation of the guide 20 more fluid when circular cuts are made. The top end of the spindle 37 penetrates through the slot 21 and the opening of the end cap such that the top end of the spindle 37 is disposed above the closed end of the end cap 35. The longitudinal length of the spindle 37 is registered perpendicular to the longitudinal length of the rectilinear rail 20 when the spindle 37 is penetrated through the slot 21.

The removable securing mechanism further includes a wing-nut 39 attached to the top end of the spindle 37 and adjusted along the longitudinal length thereof. Such a wing-nut 39 contacts the upper surface of the end cap 35 during operating conditions. The disc 38 and the spindle 37 and the end cap 35 and the wing-nut 39 respectively cooperate to prohibit the end cap 35 from prematurely and undesirably shifting along the longitudinal length of the rectilinear rail 20 during operating conditions. The wing nut 39 essentially provides a mechanism for allowing an end cap 35 to be loosened or tightened as needed by a user over a work space. When the wing nut 39 is loosened, the end cap may advantageously slide along the guide 20 and thereby be tightened in a selected position along the guide 20. Height over the workspace is not adjustable. Disc 38 is a washer on top of the arm 40. Washer 38 makes rotations of guide 20 easier, when circular cuts are made.

The removably securing mechanism further includes a bolt 70 located adjacent to the wing nut 39 of the end cap 35. The bolt 70 is essential for use of the apparatus with a power tool such as a ROTOZIP®, used for making circular cuts. When making circular cuts with a ROTOZIP® or other similar tool, one end cap 35 should be secured on guide 20 by the bolt 70. The other end cap 35 should be removed. The ROTOZIP® is assembled on the rotary guide 22 and then attached to guide 20. The wing nut 39 should not be tightened enough to contact the upper surface of the end cap 35 in order to ensure that the guide may be rotated in order to make a circular cut with ease. The bolt 70 secure end caps 35 on the guide 20 the same way as parts 26, 27 secure sleeve 24 against pole 25 in FIG. 2. The bolt 70 is essential when making circular cuts because one end cap 35 is secured on guide 20 by bolt 70 and another end cap is removed. The top of the guide 20 is secured with end cap 35 on a working surface by a clamp. A power tool, ROTOZIP®, is assembled on part 22 and attached to guide 20. The wing-nut 39 is not in contact with the upper surface of the end cap 35 and therefore allows guide 20 to create a circular cut with a center at spindle 37.

The removable securing mechanism further includes a first arm 40 provided with top and bottom surfaces 41, 42 and opposed right and left ends 43, 44 respectively. Such a top surface 41 and right end 43 respectively of the first arm 40 is statically connected directly, without the use of intervening characters, to a bottom surface of the disc 38, and the left end 44 of the first arm 40 extends outwardly and away from the right end 43 of the first arm 40. The first arm 40 has a longitudinal length that is greater than a diameter of the disc 38, and the longitudinal length of the first arm 40 is oriented at a right angle to the bottom surface of the disc 38. The bottom surface of the right end 43 of the first arm 40 has a cavity 45 monolithically formed therein.

The removable securing mechanism further includes a rectilinear beam 46 with axially opposed top and bottom ends 47, 48 respectively. The top end 47 of such a beam 46 is statically interfitted within the cavity 45 of the right end 43 of the first arm, and the bottom end 48 of the beam extends downwardly from the top end 47 of the beam. The mechanism further includes a second arm 49 with opposed right and left ends 50, 51 respectively. The right end 50 of such a second arm has a passageway 52 formed therein which is important such that the bottom end 48 of the beam is telescopically interfitted within the passageway of the right end 50 of the second arm 49, and the second arm 49 is telescopically adjusted along an entire longitudinal length of the beam 46. The second arm 49 further has a longitudinal length that is equal to the longitudinal length of the first arm 40 and further is registered in parallel with the longitudinal length of the first arm 40 when the beam 46 is interfitted within the passageway 52 of the right end of the second arm. The left end 51 of the second arm has a bore 53 formed therein. Such a bore 53 has a centrally registered axis oriented at a right angle to the longitudinal length of the second arm. The rectilinear beam provides a mechanism for the apparatus to be moved closer to or farther from a work space.

The removable securing mechanism further includes a shaft 54 with axially opposed top and bottom ends 55, 56 respectively. The top end 55 of such a shaft 54 has a stop block 60 monolithically formed therewith. Such a stop block 60 has a diameter that is greater than a diameter of the shaft 54 and the bore 53 respectively. The shaft 54 is interfitted within the bore 53 and adjusted along an entire longitudinal length thereof. The mechanism further includes a linear handle 57 integrally attached to the shaft 54 and spaced from the bottom end thereof, the handle 57 extending beyond diametrically opposed outer surfaces of the shaft. Such a handle 57 has a longitudinal length oriented perpendicular to the longitudinal length of the shaft 54, and the shaft 54 rotates in sync with the handle 57. The first arm 40 and the beam 46 and the second arm 49 and the shaft 54 and the stop block 60 respectively cooperate to maintain the rectilinear guide 20 and the rotary guide respectively in a fixed position when the guide system is attached to a support surface.

The rectilinear guide provides the unexpected benefit of allowing a user to move horizontally along a given work space, thereby ensuring an evenly produced work product. In addition, the rotary guide provides a mechanism for suspending a power tool above a work space, thereby preventing the need for a user to manually suspend a tool over a work space. The above-mentioned combination of one end cap 34 and power tool assembly 22 on the guide 20 allows a user to make circular cuts using a power tool such as the ROTOZIP®. Such benefits overcome the above noted shortcomings.

In use, a method for assisting a user to make accurate cuts easily and quickly when employing power saws and like power tools via use of a guide assembly includes the steps of: providing a rectilinear guide 20 and attaching the rotary guide 22 to the rectilinear guide 20. Such a rotary guide 22 extends upwardly and away from the rectilinear guide 20. The steps further include securing the rectilinear guide 20 to a support surface.

In use, the method further includes the step of providing a plurality of cylindrical clamps 23. Each of such clamps has manually adjusted inner diameters. The steps further include providing a sleeve 24 monolithically formed with an outer surface of the clamp 23. Such a sleeve 24 has a centrally registered axis oriented parallel with a centrally registered axis of the clamp 23, and further has an aperture 25 formed in a medial portion of an outer surface thereof and located diametrically opposite of the clamp. Such an aperture 25 has a centrally registered axis oriented perpendicular to the centrally registered axis of the sleeve 24.

The steps further include interfitting a post 25 with axially opposed top and bottom ends respectively within the sleeve 24. Such a post 25 has a diameter that is less than a diameter of the sleeve 24. The steps further include: adjusting the sleeve 24 telescopically along an entire longitudinal length of the post 25 and providing a knob 26 with a rod 27 with a first end directly attached to a bottom surface of the knob 26. Such a rod 27 has a second end extending outwardly and away from the first end of the rod, and the rod has a longitudinal length registered at a right angle to the bottom surface of the knob 26. The steps further include rotating the rod 27 in sync with the knob 26 and interfitting the second end of the rod within the aperture 25 of the sleeve 24 such that the second end of the rod 27 is abutted directly against an outer surface of the post 25 thereby prohibiting the sleeve 24 from prematurely and undesirably shifting along the longitudinal length of the post 25 during operating conditions.

In use, the method further includes the step of providing a substantially U-shaped base plate 29 with a closed end integrally attached to the bottom end of the post 25. The post 25 is located in a center region of the top end of such a base plate 29, and the closed end of the base plate 29 has an upper surface registered perpendicular to the longitudinal length of the post. The base plate 29 has a lateral width that is greater than a lateral width of the rectilinear rail 20. The steps further include: interfitting the rectilinear rail 20 within an open end of the base plate 29; adjusting the base plate 29 along an entire longitudinal length of the rectilinear rail; abutting an upper surface of the rectilinear rail 20 directly against a lower surface of the base plate 29 when the rectilinear rail is slidably interfitted within the open end of the base plate; and providing a plurality of holes 30 formed in longitudinally opposed ends of the base plate 29. Such holes 30 are equidistantly spaced from each other and the opposed ends respectively, and further are equidistantly spaced from opposed lateral edges respectively of the base plate 29. The holes 30 have a centrally registered axis oriented perpendicular to the upper surface of the base plate.

The steps further include penetrating a bolt 31 with axially opposed top and bottom ends respectively through the slot 21 during operating conditions. The bottom end of such a bolt 31 has a stop member 33 monolithically formed therewith and contacting a lower surface of the rectilinear rail 20, and the top end of the bolt 31 penetrates through the slot 21 and an associated one of the holes 30 of the base plate 29 respectively such that the top end of the bolt 31 is disposed above the closed end of the base plate 29. The bolt has a longitudinal length registered perpendicular to the longitudinal length of the rectilinear rail when the bolt is penetrated through the slot.

The steps further include attaching a wing-nut 32 to the top end of the bolt 31 and adjusting the wing-nut 32 along the longitudinal length of the bolt. Such a wing-nut 32 contacts the upper surface of the base plate 29 during operating conditions. The stop member 33 and the bolt 31 and the base plate 29 and the wing-nut 32 respectively cooperate to prohibit the base plate 29 from prematurely and undesirably shifting along the longitudinal length of the rectilinear rail during operating conditions.

In use, the method of further includes the steps of: interfitting a pair of substantially U-shaped end caps 35 over the rectilinear rail 20; adjusting each of the end caps 35 simultaneously and independently along the longitudinal length of the rectilinear rail; and abutting a lower surface of an open end of each of the end caps 35 directly against the upper surface of the rectilinear rail 20 when the end caps 35 are slidably interfitted thereon. Such end caps 35 have a lateral width that is greater than the lateral width of the rectilinear rail 20. The steps further include providing an opening 36 formed in each of the end caps 35 and located in a central region thereof. Such an opening 36 has a centrally registered axis oriented perpendicular to an upper surface thereof.

The steps further include penetrating a pair of spindles 37 with axially opposed top and bottom ends respectively through the slot 21 during operating conditions. The bottom end of such a spindle 37 has a disc 38 monolithically formed therewith, and the disc 38 has a top surface oriented perpendicular to a longitudinal length of the spindle 37. The steps further include penetrating the top end of the spindle 37 through the slot 21 and the opening 36 of the end cap 35 such that the top end of the spindle 37 is disposed above the closed end of the end cap 35. The longitudinal length of the spindle 37 is registered perpendicular to the longitudinal length of the rectilinear rail 20 when the spindle is penetrated through the slot.

The steps further include attaching a wing-nut 39 to the top end of the spindle and adjusting the wing-nut along the longitudinal length of the spindle 37. Such a wing-nut 39 contacts the upper surface of the end cap 35 during operating conditions. The disc 38 and the spindle 37 and the end cap 35 and the wing-nut 39 respectively cooperate to prohibit the end cap 35 from prematurely and undesirably shifting along the longitudinal length of the rectilinear rail during operating conditions.

In use, the method further includes the steps of providing a first arm 40 with top and bottom surfaces 41, 42 and opposed right and left ends 43, 44 respectively. Such a top surface and the right end respectively of the first arm 40 are statically connected directly to a bottom surface of the disc. The left end of the first arm 40 extends outwardly and away from the right end of the first arm, and the first arm 40 has a longitudinal length that is greater than a diameter of the disc. The longitudinal length of the first arm is oriented at a right angle to the bottom surface of the disc, and the bottom surface of the right end of the first arm has a cavity 45 monolithically formed therein.

The steps further include interfitting a top end of a rectilinear beam 46 within the cavity 45 of the right end of the first arm. Such a beam 46 has a bottom end extending downwardly and away from the top end of the beam. The steps further include providing a second arm 49 with opposed right and left ends 50, 51 respectively. Such a right end of the second arm 49 has a passageway 52 formed therein. The steps further include interfitting the bottom end of the beam 46 within the passageway 52 of the right end of the second arm 49 and adjusting the second arm 49 telescopically along an entire longitudinal length of the beam 46. The second arm 46 has a longitudinal length that is equal to the longitudinal length of the first arm 40 and further is registered in parallel with the longitudinal length of the first arm when the beam 46 is interfitted within the passageway 52 of the right end of the second arm 49. The left end of the second arm 49 has a bore 53 formed therein, and the bore 53 has a centrally registered axis oriented at a right angle to the longitudinal length of the second arm 49.

The steps further include providing a shaft 54 with axially opposed top and bottom ends respectively. Such a top end of the shaft 54 has a stop block 56 monolithically formed therewith. Such a stop block 56 has a diameter that is greater than a diameter of the shaft 54 and the bore 53 respectively. The steps further include interfitting the shaft 54 within the bore 53 of the left end of the second arm 49. The steps further include adjusting the shaft within the bore along an entire longitudinal length of the shaft.

The steps further include providing a linear handle 57 integrally attached to the shaft 54 and spaced from the bottom end thereof. Such a handle 57 extends beyond diametrically opposed outer surfaces of the shaft 54 and has a longitudinal length oriented perpendicular to the longitudinal length of the shaft 54. The steps further include rotating the shaft 54 in sync with the handle 57. The first arm 40 and the beam 46 and the second arm 49 and the shaft 54 and the stop block 56 respectively cooperate to maintain the rectilinear guide and the rotary guide respectively in a fixed position when the guide system is attached to a support surface.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A guide assembly for power tools for assisting a user to make accurate cuts easily and quickly when employing power saws and like power tools, said guide assembly comprising:
    a rectilinear guide;
    a rotary guide;
    means for slidably attaching said rotary guide to said rectilinear guide; and means for removably securing said rectilinear guide to a support surface,
    wherein said rectilinear guide has a slot formed therein, said slot having a longitudinal length oriented parallel to opposed lateral edges of said rectilinear guide and further being equidistantly spaced from said respective lateral edges, said slot having longitudinally opposed ends terminating proximal of associated ones of longitudinally opposed ends of said rectilinear guide,
  wherein said rotary guide comprises:
    a plurality of cylindrical clamps, each of said clamps having manually adjusted inner diameters;

a sleeve monolithically formed with an outer surface of each said clamp, said sleeve having a centrally registered axis oriented parallel with a centrally registered axis of said clamp, said sleeve having an aperture formed in a medial portion of an outer surface thereof and located diametrically opposite of said clamp, said aperture having a centrally registered axis oriented perpendicular to said centrally registered axis of said sleeve;

a post having axially opposed top and bottom ends respectively, said post having a diameter that is less than a diameter of said sleeve such that said post is interfitted within said sleeve, said sleeve being telescopically adjusted along an entire longitudinal length of said post; and a knob provided with a rod having a first end directly attached to a bottom surface of said knob, said rod having a second end extending outwardly and away from said first end of said rod, said rod having a longitudinal length registered at a right angle to said bottom surface of said knob, said rod rotating in sync with said knob;

wherein said second end of said rod is interfitted within said aperture of said sleeve such that said second end of said rod is abutted directly against an outer surface of said post thereby prohibiting said sleeve from prematurely and undesirably shifting along said longitudinal length of said post during operating conditions.

2. The guide assembly of claim 1, wherein said slidably attaching means comprises:

a substantially U-shaped base plate having a closed end integrally attached to said bottom end of said post, said post being located in a center region of said top end of said base plate, said closed end of said base plate having an upper surface registered perpendicular to said longitudinal length of said post, said base plate having a lateral width that is greater than a lateral width of said rectilinear rail such that said rectilinear rail is slidably interfitted within an open end of said base plate, said base plate being adjusted along an entire longitudinal length of said rectilinear rail;

wherein an upper surface of said rectilinear rail is abutted directly against a lower surface of said base plate when said rectilinear rail is slidably interfitted within said open end of said base plate;

a plurality of holes formed in longitudinally opposed ends of said base plate, said holes being equidistantly spaced from each other and said opposed ends respectively, said holes further being equidistantly spaced from opposed lateral edges respectively of said base plate, said holes having a centrally registered axis oriented perpendicular to said upper surface of said base plate;

a bolt having axially opposed top and bottom ends respectively, said bolt having a diameter that is less than a lateral width of said slot such that that said bolt is penetrated therethrough during operating conditions, said bottom end of said bolt having a stop member monolithically formed therewith and contacting a lower surface of said rectilinear rail, said top end of said bolt penetrating through said slot and an associated one of said holes of said base plate respectively such that said top end of said bolt is disposed above said closed end of said base plate, said bolt having a longitudinal length registered perpendicular to said longitudinal length of said rectilinear rail when said bolt is penetrated through said slot; and a wing-nut attached to said top end of said bolt and adjusted along said longitudinal length thereof, said wing-nut contacting said upper surface of said base plate during operating conditions;

wherein said stop member and said bolt and said base plate and said wing-nut respectively cooperate to prohibit said base plate from prematurely and undesirably shifting along said longitudinal length of said rectilinear rail during operating conditions.

3. The guide assembly of claim 2, wherein said removable securing means comprises:

a pair of substantially U-shaped end caps slidably interfitted over said rectilinear rail, each of said end caps being simultaneously and independently adjusted along said longitudinal length of said rectilinear rail, each of said end caps having an open end provided with a lower surface abutted directly against said upper surface of said rectilinear rail when said end caps are slidably interfitted thereon, said end caps having a lateral width that is greater than said lateral width of said rectilinear rail;

an opening formed in each of said end caps and located in a central region thereof, said opening having a centrally registered axis oriented perpendicular to an upper surface thereof a pair of spindles having axially opposed top and bottom ends respectively, each of said spindles having a diameter that is less than said lateral width of said slot such that that said spindle is penetrated therethrough during operating conditions, said bottom end of said spindle having a disc monolithically formed therewith, said disc having a top surface oriented perpendicular to a longitudinal length of said spindle, said top end of said spindle penetrating through said slot and said opening of said end cap such that said top end of said spindle is disposed above said closed end of said end cap, said longitudinal length of said spindle being registered perpendicular to said longitudinal length of said rectilinear rail when said spindle is penetrated through said slot; and a wing-nut attached to said top end of said spindle and adjusted along said longitudinal length thereof, said wing-nut contacting said upper surface of said end cap during operating conditions;

wherein said disc and said spindle and said end cap and said wing-nut respectively cooperate to prohibit said end cap from prematurely and undesirably shifting along said longitudinal length of said rectilinear rail during operating conditions.

4. The guide assembly of claim 3, wherein said removable securing means further comprises:

a first arm provided with top and bottom surfaces and opposed right and left ends respectively, said top surface and said right end respectively of said first arm being statically connected directly to a bottom surface of said disc, said left end of said first arm extending outwardly and away from said right end of said first arm, said first arm having a longitudinal length that is greater than a diameter of said disc, said longitudinal length of said first arm being oriented at a right angle to said bottom surface of said disc, said bottom surface of said right end of said first arm having a cavity monolithically formed therein;

a rectilinear beam with axially opposed top and bottom ends respectively, said top end of said beam being statically interfitted within said cavity of said right end of said first arm, said bottom end of said beam extending downwardly from said top end of said beam;

a second arm having opposed right and left ends respectively, said right end of said second arm having a passageway formed therein such that said bottom end of said beam is telescopically interfitted within said passageway of said right end of said second arm, said second arm being telescopically adjusted along an entire longitudinal length of said beam, said second arm having a longitudinal length that is equal to said longitudinal length of said first arm and further being registered in parallel with said longitudinal length of said first arm when said beam is interfitted within said passageway of said right end of said second arm, said left end of said second arm having a bore formed therein, said bore having a centrally registered axis oriented at a right angle to said longitudinal length of said second arm;

a shaft with axially opposed top and bottom ends respectively, said top end of said shaft having a stop block monolithically formed therewith, said stop block having a diameter that is greater than a diameter of said shaft and said bore respectively, said shaft being interfitted within said bore and adjusted along an entire longitudinal length thereof; and a linear handle integrally attached to said shaft and spaced from said bottom end thereof, said handle extending beyond diametrically opposed outer surfaces of said shaft, said handle having a longitudinal length oriented perpendicular to said longitudinal length of said shaft, said shaft rotating in sync with said handle;

wherein said first arm and said beam and said second arm and said shaft and said stop block respectively cooperate to maintain said rectilinear guide and said rotary guide respectively in a fixed position when said guide system is attached to a support surface.

* * * * *